United States Patent
Norris et al.

(10) Patent No.: US 10,267,821 B2
(45) Date of Patent: Apr. 23, 2019

(54) WIND DIRECTION INDICATOR

(71) Applicant: Cirrus Outdoors, LLC, Conroe, TX (US)

(72) Inventors: Jeffrey Norris, Montgomery, TX (US); James Angelo Angott, Victoria, TX (US)

(73) Assignee: Cirrus Outdoors, LLC, Conroe, TX (US)

(*) Notice: Subject to any disclaimer, the term of this patent is extended or adjusted under 35 U.S.C. 154(b) by 30 days.

(21) Appl. No.: 15/786,349

(22) Filed: Oct. 17, 2017

(65) Prior Publication Data

US 2018/0038884 A1 Feb. 8, 2018

Related U.S. Application Data

(63) Continuation of application No. 14/942,098, filed on Nov. 16, 2015, now Pat. No. 9,841,433.

(51) Int. Cl.
| | |
|---|---|
| *G01P 13/02* | (2006.01) |
| *G01P 13/00* | (2006.01) |
| *C06D 3/00* | (2006.01) |
| *A63J 5/02* | (2006.01) |
| *A01M 31/00* | (2006.01) |
| *A24F 47/00* | (2006.01) |

(52) U.S. Cl.
CPC ............ *G01P 13/02* (2013.01); *A01M 31/00* (2013.01); *A63J 5/025* (2013.01); *C06D 3/00* (2013.01); *G01P 13/00* (2013.01); *G01P 13/0093* (2013.01); *A24F 47/008* (2013.01)

(58) Field of Classification Search
CPC ...................................................... G01P 13/02
See application file for complete search history.

(56) References Cited

U.S. PATENT DOCUMENTS

| | | | |
|---|---|---|---|
| 2,254,680 A | 9/1937 | Whilton |
| 2,311,199 A | 12/1939 | Anton |
| 2,882,240 A | 2/1956 | Charwat |
| 3,112,645 A | 12/1963 | Glass |
| 3,658,719 A | 4/1972 | McConnaughey |
| 3,990,987 A | 11/1976 | Rogers |
| 4,423,626 A | 1/1984 | Herschede |
| 4,813,437 A | 3/1989 | Ray |
| 9,078,474 B2 | 7/2015 | Thompson |
| 9,426,977 B1 | 8/2016 | Wynalda |
| 9,603,387 B2 | 3/2017 | Liu |
| 9,739,796 B2 | 8/2017 | Ferrara, Jr. |

(Continued)

OTHER PUBLICATIONS

Pea Soup Ltd.—The Smoke Machine Specialists, "Battery Powered Smoke Machines", Jul. 6, 2014 (wayback machine snapshot). Retrieved from https://web.archive.Org/web/20140706163340/http://www.smokemachines.net/buy-tiny-foggers.shtml. Accessed Apr. 24, 2017.*

(Continued)

*Primary Examiner* — Son T Le
*Assistant Examiner* — Herbert K Roberts
(74) *Attorney, Agent, or Firm* — Tumey L.L.P.

(57) ABSTRACT

A wind direction indicator for hunters includes a smoke generator, a housing, an electrical power source, an air pump and a switch all arranged such that the indicator may be actuated by a hunter using a single hand. The smoke generator may be a cartomizer as an example.

5 Claims, 1 Drawing Sheet

(56) References Cited

U.S. PATENT DOCUMENTS

| | | | |
|---|---|---|---|
| 2002/0071664 A1 | 6/2002 | Aronie | |
| 2003/0226268 A1 | 12/2003 | Gibson | |
| 2006/0042373 A1 | 3/2006 | Kirollos | |
| 2009/0147506 A1 | 6/2009 | Robinson | |
| 2011/0142429 A1* | 6/2011 | Joseph | A63J 5/025 392/394 |
| 2012/0204889 A1 | 8/2012 | Xiu | |
| 2012/0318882 A1* | 12/2012 | Abehasera | A61M 11/041 239/1 |
| 2013/0220315 A1 | 8/2013 | Conley | |
| 2014/0290650 A1 | 10/2014 | Ivey | |
| 2015/0181944 A1 | 7/2015 | Li | |
| 2015/0296884 A1* | 10/2015 | Liu | A24F 47/008 131/329 |
| 2016/0310624 A1 | 10/2016 | Wynalda | |

OTHER PUBLICATIONS

Pea Soup Ltd.—The Smoke Machine Specialists, "Battery Powered Smoke Machines," Jul. 6, 2014 (wayback machine snapshot). Retrieved from https://web.archive.org/web/201407061/http://www.smokemachines.net/buy-tiny-foggers.shtml. Accessed Apr. 24, 2017.

USPTO Notice of Allowance for U.S. Appl. No. 14/942,098 dated Sep. 21, 2017.

USPTO Non-Final Office Action for U.S. Appl. No. 14/942,098 dated Apr. 27, 2017.

\* cited by examiner

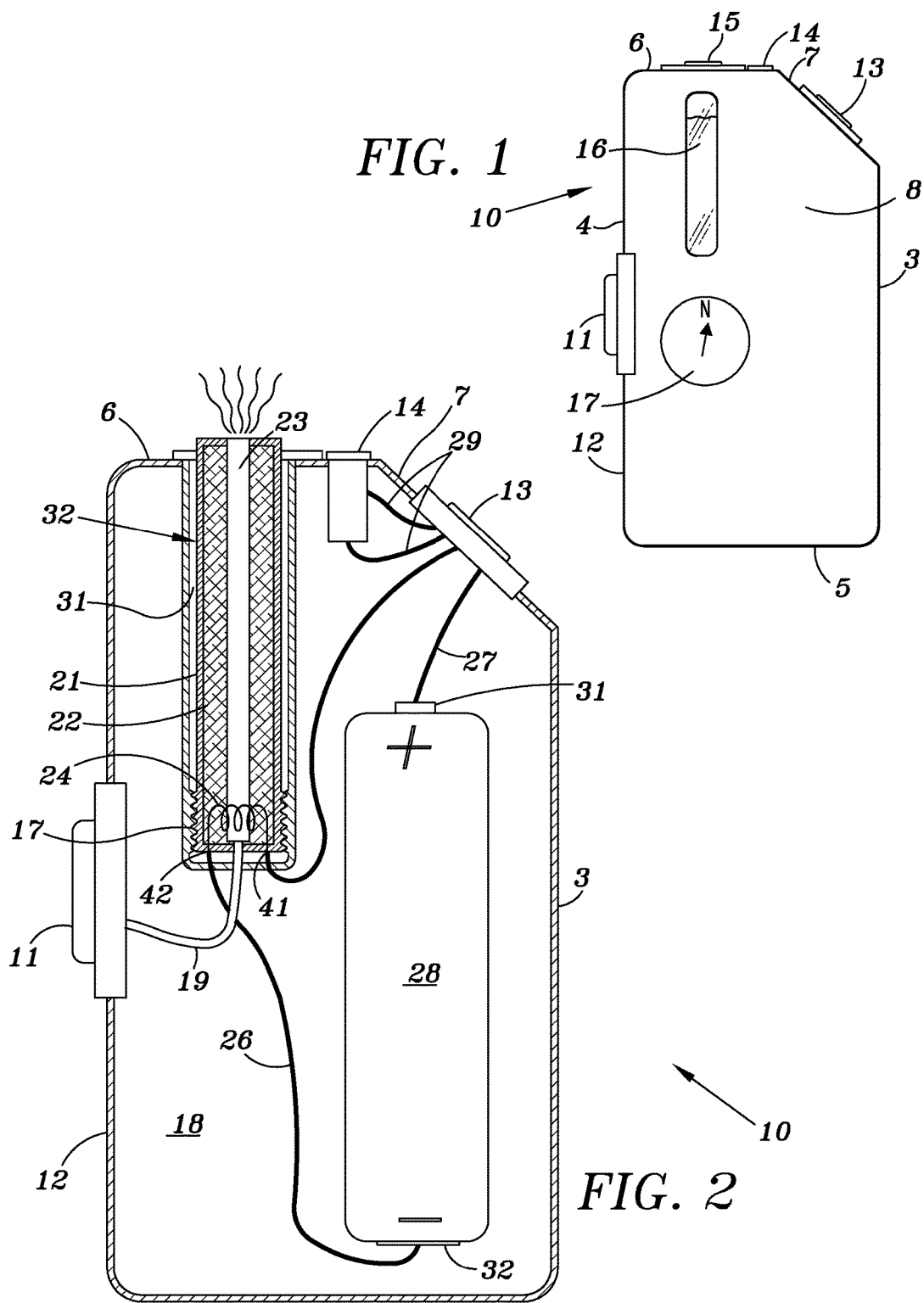

WIND DIRECTION INDICATOR

This application is a continuation application of U.S. patent application Ser. No. 14/942,098 filed Nov. 16, 2015, which is herein incorporated by reference in its entirely.

BACKGROUND OF THE INVENTION

Field of the Invention

This invention is directed to a portable, hand held device for generating smoke which will serve to indicate the wind direction in an outdoor location.

Background of the Invention

While hunting is it extremely important to position oneself downwind of the game being hunted. This is because the game normally has a highly acute sense of smell and would therefore detect the presence of a human should the human be in a position upwind of the game. Various attempts to provide an indication of the wind direction have not been fully successful. For example, U.S. Pat. No. 4,423,626 discloses a squeeze bottle containing a powder for generating a cloud of powder. The problem with this design is that it is very difficult to control the proper cloud dispersion for properly checking wind direction. Also, the movement required to shake the container to dispense the talc powder can spook game. The talc powder being a solid, also does not carry well. For example in the mountains where you have thermal updrafts and downdrafts, the talcum powder being a solid will fall, whereas smoke will rise and fall with the drafts. U.S. Pat. No. 3,112,645 discloses a smoke generator that is attached to a rifle. This is difficult to manipulate in the field since the cap must be screwed and unscrewed each time it is desired to generate smoke. Also it lacks a positive air flow generator so that the production of smoke and its release to the atmosphere is not positively assisted.

Consequently there is a need for a reliable and easy to manipulate smoke generator for use in hunting and other activities.

BRIEF SUMMARY OF SOME OF THE PREFERRED EMBODIMENTS

These and other needs in the art are addressed in one embodiment by a smoke generator that includes a smoke generator such as a cartomizer for example positioned within a hand held housing. A finger actuated air pump is positioned on an outside surface of the housing as is a finger actuated switch. A battery is positioned within the housing to provide electrical power for a heating element within the cartomizer.

The components are arranged such that the user can operate the device with one hand. A thumb of the user's hand can depress the switch to provide power for heating the smoke producing liquid within the cartomizer.

At the same time the user can actuate the air pump with a trigger finger to provide a positive flow of air to the cartomizer. The air flow forces the smoke to the ambient through an outlet.

BRIEF DESCRIPTION OF THE DRAWINGS

For a detailed description of the preferred embodiments of the invention, reference will now be made to the accompanying drawings in which:

FIG. 1 is a front view of an embodiment of the invention
FIG. 2 is an interior view of the housing of the embodiment shown in FIG. 1.

DETAILED DESCRIPTION OF THE PREFERRED EMBODIMENTS

As shown in FIG. 1, an embodiment of the invention 10 includes a generally rectangular housing having a top 6, a bottom 5, sides 3, 4 and an inclined portion 7 of the housing.

An air pump 11 similar to a priming pump for small engines is secured to side 4. A cutout or window section 16 is provided on a front panel 8 of the housing and a compass 17 may be secured to the front panel. Additionally a LED light 14 may be mounted on inclined portion 7 of the housing and connected to switch 13.

FIG. 2 illustrates the interior arrangement of the smoke direction indicator. A battery 28 is suitably mounted within the housing in a known matter and includes position and negative terminals 31 and 32 respectively which are connected to a heating element 24 via switch 13 and wires 26, 27.

A pocket 31 is positioned within and fixed to housing 12 for supporting a smoke generator 32 which may take the form of a cartomizer such as those used in electronic cigarettes, for example. Any well-known smoke generator may be used. The housing includes a rear wall 18.

An embodiment of the smoke generator includes a housing 21 having a central air passageway 23 and a fibrous mass 22 which is impregnated with a smoke generating liquid, for example a mixture of water and a glycol compound. A masking material may also be added to the mixture for masking human scent and may include natural odors such as pine or cedar.

Housing 21 may be threaded such as at 17 for retention within pocket 32 which would have complementary threads at its bottom. Smoke generator also includes a heating element 24 positioned within the fibrous mass 22. Heating coil 24 includes positive and negative terminals 41, 42 which are connected to battery 28 via a known battery connector as is known in the art.

Air passageway 23 extends through housing 21 at its lower end and is connected to a conduit 19 which is connected to air pump 11. A hunter may operate pump 11 with a trigger finger to cause air flow through passageway 23 which will entrain smoke being generated by the smoke generator.

In use, a hunter may hold the housing 12 in one hand such that the thumb of the user may be used to close switch 13 while at the same time the hunter can operate air pump 11 with a trigger finger. Thus as smoke is generated within the smoke generator by heating of the liquid, air will be forced through passageway 23 by pump 11 and will entrain the smoke formed within the smoke generator.

It should be noted that while the above description of the invention is in terms of a wind direction indicator for hunters, the device could be used to detect leaks in fluid pressure systems such as air conditioning systems, or for aiding golfers in determining the wind direction prior to striking the golf ball.

Furthermore, although the smoke generator has been illustrated in the drawings is being positioned within the housing, in an attentive embodiment the smoke generator 32 may be threaded in a connector located in the top portion 6 of the housing.

What is claimed is:

1. A wind direction indicator for indicating the direction of wind in ambient surroundings comprising:
   a first housing including a pocket positioned therein;
   a smoke generator including a second housing containing a heating element, an air passageway, and a fibrous mass impregnated with a smoke generating liquid, wherein the fibrous mass surrounds the air passageway, the second housing is detachably secured in the pocket, and the second housing is disposed substantially entirely within the pocket;
   a finger operated bellows air pump having an outlet connected to the air passageway of the smoke generator; and
   a switch connected to the heating element for energizing the heating element from a power source whereby smoke is discharged into the ambient.

2. The wind direction indicator of claim 1 wherein the first housing includes an inclined portion between a top and a side portion, the switch being mounted on the inclined portion, and the air pump being mounted on a second side portion, whereby the wind indicator may be actuated by a user's thumb and trigger finger.

3. The wind direction indicator of claim 1 further including a light mounted on the top of the first housing for illuminating the smoke as it is generated.

4. The wind direction indicator of claim 1 wherein the air pump outlet is connected to the internal air passageway by a conduit.

5. The wind direction indicator of claim 1 wherein the smoke generator comprises a cartomizer.

* * * * *